2,928,864

METHOD FOR THE MANUFACTURE OF MIXED PHOSPHOROTHIOATE ESTERS

Edward J. Tabor, Midland, Mich., assignor to The Dow Chemical Company, Midland, Mich., a corporation of Delaware No Drawing. Application January 8, 1958
Serial No. 707,669

6 Claims. (Cl. 260—461)

The present invention relates to an improved method for the production of mixed phosphorothioate esters and is particularly concerned with a method for the manufacture of O-aryl O,O-dialkyl phosphorothioates. These compounds are viscous liquids or crystalline solids which are soluble in many organic solvents and of low solubility in water. They are active as parasiticides and are adapted to be employed as active toxic constituents of compositions for the control of bacteria, fungi, mites and insect organisms such as aphids, Southern army worms and flies. The compounds are also useful as preservatives for paper, paint and wood.

Several methods of preparing the O-aryl O,O-dialkyl phosphorothioates are known. In one method, the compounds may be prepared by the reaction of an O-aryl phosphorodichloridothioate and an alkali metal alcoholate or by the reaction of an O,O-dialkyl phosphorochloridothioate and an alkali metal phenolate. The contacting of the reactants in such methods is carried out in an inert organic solvent and at a temperature of from about 15° to 80° C. When operating in accordance with such methods, the O-aryl O,O-dialkyl phosphorothioates are obtained in yields of about 55 percent or less. In still another method, the mixed phosphorothioate esters may be prepared in yields of about 75 percent by the reaction of an O,O-dialkyl phosphorochloridothioate with an aqueous solution of a sodium phenolate in the presence of a copper catalyst. A method for the production of mixed phosphorothioate esters in superior yields would be very desirable.

It is an object of the present invention to provide an improved method for the manufacture of mixed phosphorothioate esters. Another object is to provide a method which employs no catalyst and which may be carried out in water as reaction medium. A further object is to provide a method which gives the O-aryl, O,O-dialkyl phosphorothioates in greater yield and purity than has been obtainable by known methods. Other objects will appear from time to time throughout the following specification and appended claims.

The new and improved method comprises reacting in the absence of a catalyst and at a temperature of from 40° to 70° C. one molecular proportion of an O,O-di(lower-alkyl) phosphorochloridothioate with a mixture comprising at least one molecular proportion of each of an alkali metal hydroxide and a phenolic compound having the formula ROH wherein R represents an aryl radical, said alkali metal hydroxide being employed in the form of an aqueous solution containing at least 10 percent by weight of the alkali metal hydroxide. The reaction takes place smoothly under these described conditions with the production of the desired mixed phosphorothioate esters in high yields and excellent purity. Upon completion of the reaction, the desired mixed ester, if a solid, may be separated by filtration, successively washed with aqueous alkali metal hydroxide and water, and air-dried. Where the mixed ester product is a liquid, it may be separated by decantation and thereafter washed as above to obtain the desired product as a liquid residue.

The employment of an aqueous solution containing at least 10 percent by weight of an alkali metal hydroxide such as sodium hydroxide or potassium hydroxide is essential and critical for the practice of the present invention and the obtaining of the very desirable and high yields of the mixed phosphorothioate esters. In a preferred embodiment of the invention, an aqueous solution containing from 10 to about 25 percent by weight of the alkali metal hydroxide is employed. A concentration substantially less than 10 percent by weight materially reduces the yields of the desired mixed esters and should not be employed. The upper limit of the concentration of alkali metal hydroxide which may be used varies with the employed alkali metal hydroxide and phenolic compound. In any event, the concentration of the alkali metal hydroxide must not be so high as to produce a thickened slurry so that adequate contacting of the reagents cannot be effected. Under such conditions, the yields of the desired mixed phosphorothioate esters are materially reduced. Usually adequate contacting may be maintained at concentrations up to about 25 percent by weight of alkali metal hydroxide. A preferred operation comprises employing an aqueous solution containing from 10 to 20 percent by weight of alkali metal hydroxide.

In the practice of the present invention, it is essential that one molecular proportion of the O,O-di(lower-alkyl) phosphorochloridothioate is reacted with a mixture containing at least one molecular proportion of each of the alkali metal hydroxide and phenolic compound. A proportion somewhat smaller than one molecular proportion of each of the phosphorochloridothioate and alkali metal hydroxide materially reduces the yields of the desired mixed ester products and should not be employed. In a preferred method of the present invention, one molecular proportion of the O,O-di(lower-alkyl) phosphorochloridothioate is reacted with a mixture containing from 1.25 to 1.5 molecular proportions of each of the alkali metal hydroxide and phenolic compound. When operating under such conditions, optimum yields of the desired mixed esters are obtained. A larger proportion of the alkali metal hydroxide or phenolic compound may be employed but is undesirable from the standpoint of economy.

The esterification reaction should be carried out at temperatures of from 40° to 70° C. and preferably at the temperature range of from 50° to 60° C. The reaction takes place smoothly under these temperature conditions with the production of the desired ester product and alkali metal chloride of reaction. The reaction is somewhat exothermic and the temperature may be controlled by regulating the rate of contacting the reactants and by external cooling. It is essential that temperatures significantly above or below the specified range not be employed for any appreciable period of time as they materially reduce the yield of the desired ester products.

The rate at which the formation of the desired mixed phosphorothioate esters takes place has been found to vary directly with the employed temperature, the longer periods being employed at the lower temperatures. In general, the reactants may be contacted at as rapid a rate as will permit the control of the temperature within the limits specified. The reaction is generally complete in about one hour.

In carrying out the reaction, the O,O-di(lower-alkyl) phosphorochloridothiate is added portionwise with stirring to a mixture of the alkali metal hydroxide, phenolic compound and water. In an alternative method of operation, the order of addition of the reactants is reversed. In either method of operation, the addition is carried out with stirring and at a temperature of from 40° to 70° C.

Upon completion of the reaction, the reaction mixture is cooled to room temperature and thereafter treated as previously described to separate the desired mixed phosphorothioate ester as a liquid or crystalline residue.

The following examples illustrate the invention but are not to be construed as limiting.

*Example 1.—O - (2,4,5 - trichlorophenyl) O,O-dimethyl phosphorothioate*

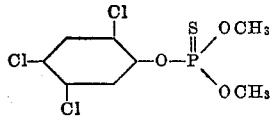

328 grams (2.05 moles) of O,O-dimethyl phosphorochloridothioate was added portionwise with stirring to a mixture of 106 grams (2.65 moles) of sodium hydroxide, 424 grams (23.5 moles) of water and 494 grams (2.53 moles) of 2,4,5-trichlorophenol. The addition was carried out at a temperature of from 38° to 51° C. with external cooling and over a period of 25 minutes. Following the addition, the temperature was raised and maintained at 60° C. for a period of 25 minutes. The reaction mixture was then cooled to 45° C. and 600 milliliters of 5 percent sodium hydroxide added with stirring. The reaction mixture was thereafter allowed to cool to room temperature. During the cooling, a solid precipitated which was separated by filtration, washed with water and air-dried. As a result of these operations, there was obtained 585 grams of an O-(2,4,5-trichlorophenyl) O,O-dimethyl phosphorothioate product melting at 40° C. The yield was 91 percent based upon the O,O-dimethyl phosphorochloridothioate starting material.

*Example 2.—O - (2,4,5 - trichlorophenyl) O,O - diethyl phosphorothioate*

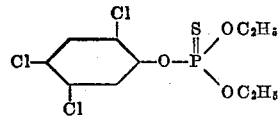

O,O-diethyl phosphorochloridothioate (188.5 grams, 1.0 mole) was added portionwise with stirring to a mixture of 208 grams (11.5 moles) of water, 52 grams (1.3 moles) of sodium hydroxide and 246 grams (1.24 moles) of 2,4,5-trichlorophenol. The addition was carried out over a period of 20 minutes and at a temperature of from 40° to 48° C. with external cooling. Following the addition, the temperature was raised to 60° C. and maintained at from 60°-70° C. for a period of one hour. The reaction mixture was then cooled to 45° C. and 375 milliliters of 5 percent aqueous sodium hydroxide added with stirring over a period of 10 minutes. When stirring ceased, the liquid product which formed during the reaction was separated from the water layer, washed with water and thereafter dried at a temperature of 69° C. and under a vacuum of 13 millimeters. As a result of these operations, there was obtained 312 grams of an O-(2,4,5-trichlorophenyl) O,O-diethyl phosphorothioate product as a pale yellow liquid having a refractive index $n/D$ of 1.5449 at 25° C. The yield was 92 percent based upon the O,O-diethyl phosphorochloridothioate starting material.

*Example 3.—O-(2,4-dichlorophenyl) O,O-dimethyl phosphorothioate*

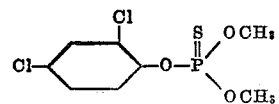

336 grams (2.1 moles) of O,O-dimethyl phosphorochloridothioate was added portionwise with stirring to a mixture of 424 grams (23.5 moles) of water, 106 grams (2.65 moles) of sodium hydroxide and 408 grams (2.5 moles) of 2,4-dichlorophenol. The addition was carried out over a period of 37 minutes and at a temperature of from 40° to 48° C. with external cooling. Following the addition, the temperature was raised and maintained at 60° C. for a period of 30 minutes. The reaction mixture was then cooled to 40° C. and 600 milliliters of 5 percent aqueous sodium hydroxide added with stirring over a period of 5 minutes. When stirring ceased, the liquid product which formed during the reaction was separated from the water layer, washed with water and dried at a temperature of 60°-70° C. and a reduced pressure of 12 millimeters. As a result of these operations, there was obtained 500 grams of an O-(2,4-dichlorophenyl) O,O-dimethyl phosphorothioate product as a viscous liquid having a refractive index $n/D$ of 1.5496 at 25° C. The yield was 87 percent based upon the O,O-dimethyl phosphorochloridothioate starting material.

*Example 4.—O-(2-chloro-4-tertiarybutylphenyl) O,O-dimethyl phosphorothioate*

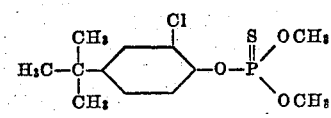

73 grams (0.45 mole) of O,O-dimethyl phosphorochloridothioate was added portionwise with stirring to a mixture of 94 grams (5.2 moles) of water, 32 grams (0.57 mole) of potassium hydroxide and 100 grams (0.54 mole) of 2-chloro-4-tertiarybutyl phenol. The addition was carried out at a temperature of from 50° to 60° C. with external cooling and over a period of 22 minutes. Following the addition, the temperature was maintained at 60°-63° C. for a period of 15 minutes. The reaction mixture was then cooled to 48° C. and 150 milliliters of 5 percent aqueous potassium hydroxide added over a period of 5 minutes with stirring. When stirring ceased, the liquid product which formed during the reaction was separated from the water layer, washed with water, filtered and dried under reduced pressure at a temperature of 60° C. As a result of these operations, there was obtained 120 grams of an O-(2-chloro-4-tertiarybutylphenyl) O,O-dimethyl phosphorothioate product as a viscous liquid having a refractive index $n/D$ of 1.5278 at 25° C. The yield was 89.2 percent based upon the O,O-dimethyl phosphorochloridothioate starting material.

*Example 5.—O-(β-naphthyl) O,O-dimethyl phosphorothioate*

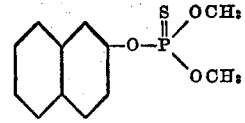

164 grams (1.0 mole) of O,O-dimethyl phosphorochloridothioate was added portionwise with stirring to a mixture of 212 grams (11.8 moles) of water, 53 grams (1.32 moles) of sodium hydroxide and 180 grams (1.25 moles) of β-naphthol. The addition was carried out over a period of 16 minutes and at a temperature of from 51° to 55° C. with external cooling. Following the addition, the temperature was raised and maintained at 60° C. for a period of 15 minutes. The reaction mixture was then cooled to 45° C. and 375 milliliters of 5 percent aqueous sodium hydroxide added with stirring over a period of 10 minutes. When stirring ceased, the liquid product which had formed during the reaction was separated from the water layer, washed with water and dried at a temperature of 74° C. and under a vacuum of 12 millimeters. As a result of these operations, there was obtained 237 grams of an O-(β-naphthyl) O,O-dimethyl phosphorothioate product as a brown, viscous liquid having a refractive index $n/D$ of 1.5936 at 25° C. The yield was 88.5 percent based upon the O,O-dimethyl phosphorochloridothioate starting material.

Example 6

O,O-dimethyl phosphorochloridothioate (65.5 grams, 0.41 mole) is added to a mixture of 193 grams (10.7 moles) of water, 21.5 grams (0.53 mole) of sodium hydroxide and 100 grams (0.5 mole) of 2,4,5-trichlorophenol to produce a reaction system containing one molecular proportion of the phosphorochloridothioate per 1.25 molecular proportions of trichlorophenol and 1.3 molecular proportions of sodium hydroxide which is employed as a 10 percent by weight aqueous solution. In a similar manner, other reaction systems are prepared in which the molar ratios of the reactants are kept constant but the concentration of the sodium hydroxide solution employed is 15 and 20 percent by weight of aqueous solution.

In each of the above systems, the phosphorochloridothioate is added portionwise with stirring to the aqueous mixture of sodium hydroxide and trichlorophenol in 15 minutes and at a temperature of from 40° to 45° C. Following the addition, the temperature is raised and maintained at 60° C. for one hour. Thereafter, the liquid product which formed is decanted from the water layer, dried at 60°–70° C. under a reduced pressure of 12 millimeters and weighed. The yields of O-(2,4,5-trichlorophenyl) O,O-dimethyl phosphorothioate for the various systems are set forth in the following table, the yields being based upon the O,O-dimethyl phosphorochloridothioate starting material:

| Mole Ratio of Reactants | | Concentration of NaOH Solution Based upon Weight of Water Employed | Percent Yield of O-(2,4,5-trichlorophenyl) O,O-dimethyl Phosphorothioate |
| --- | --- | --- | --- |
| O,O-Dimethyl Phosphorochloridothioate | 2,4,5-Trichlorophenol | | |
| 1 | 1.25 | 10 | 83 |
| 1 | 1.25 | 15 | 88.5 |
| 1 | 1.25 | 20 | 92.0 |

The new procedure of the present invention is useful for the preparation of a variety of mixed phosphorothioate esters. O,O-dialkyl phosphorochloridothioates which may be employed include O,O-dimethyl phosphorochloridothioate, O,O-diethyl phosphorochloridothioate, the O,O-dipropyl phosphorochloridothioates, the O,O-dibutyl phosphorochloridothioates and the O,O-diamyl phosphorochloridothioates. Particularly useful phenolic compounds include the benzylphenols, the methoxyphenols, the ethoxyphenols, the phenylphenols, the propoxyphenols, the chlorophenols, the bromophenols, the alkylphenols, the chloroalkylphenols, anthrol, napthol, cyclohexylphenols and bromoalkylphenols.

Using such reactants, the method of the present invention may be employed to obtain the very desirable and improved yields of the following mixed phosphorothioate esters:

O-(4-benzylphenyl) O,O-dipropyl phosphorothioate
O-(2-methoxyphenyl) O,O-dibutyl phosphorothioate
O-(2-ethyl-4-bromophenyl) O,O-diamyl phosphorothioate
O-(anthracyl) O,O-diisopropyl phosphorothioate
O-(4-cyclohexylphenyl) O,O-diethyl phosphorothioate
O-(2-ethoxy-4-chlorophenyl) O,O-ditertiarybutyl phosphorothioate
O-(2-biphenylyl) O,O-diamyl phosphorothioate
O-(2-bromo-4-propoxyphenyl) O,O-dimethyl phosphorothioate
O-(2-bromo-4-chlorophenyl) O,O-dipropyl phosphorothioate
O-(4-tertiarybutylphenyl) O,O-diethyl phosphorothioate
O-(2-chlorophenyl) O,O-disecondarybutyl phosphorothioate
O-(3,4-dibromophenyl) O,O-diamyl phosphorothioate
O-(metacresyl) O,O-diisopropyl phosphorothioate
O-(2-ethylphenyl) O,O-diethyl phosphorothioate The O,O-di(lower-alkyl) phosphorochloridothioates employed as starting materials in the present invention may be prepared by the reaction of one molecular proportion of phosphorus thiochloride with two molecular proportions of a suitable sodium alkoxide in the corresponding alcohol. The reaction is somewhat exothermic and is carried out at a temperature of from −10° to 30° C. Upon completion of the reaction, the solvent may be removed by evaporation to obtain the desired O,O-dialkyl phosphorochloridothioate as a liquid residue.

The preferred embodiments of the present invention include the manufacture of the O-aryl O,O-di(lower-alkyl) phosphorothioates having the formula

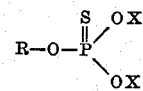

wherein R represents a phenyl radical unsubstituted or substituted by one or more substituents such as chlorine, bromine, lower alkyl, lower alkoxy, phenyl, benzyl or cyclohexyl and X represents lower alkyl. The term "lower alkyl" refers to the radicals containing from 1 to 5 carbon atoms, inclusive.

I claim:

1. A method for the manufacture of a mixed phosphorothioate ester which comprises reacting in the absence of a catalyst and at a temperature of from 40° to 70° C. one molecular proportion of an O,O-di(lower-alkyl) phosphorochloridothioate with a mixture comprising at least one molecular proportion of each of an alkali metal hydroxide and a phenolic compound, said alkali metal hydroxide being employed in the form of an aqueous solution containing at least 10 percent by weight of the alkali metal hydroxide, and said phenolic compound having the formula ROH wherein R represents a phenyl radical whose nucleus may be substituted with a radical selected from the group consisting of chlorine, bromine, lower alkyl, lower alkoxy, cyclohexyl, benzyl and phenyl.

2. A method for the manufacture of O-(2,4,5-trichlorophenyl) O,O-dimethyl phosphorothioate which comprises reacting in the absence of a catalyst and at a temperature of from 40° to 70° C. one molecular proportion of O,O-dimethyl phosphorochloridothioate with a mixture comprising at least one molecular proportion of each of 2,4,5-trichlorophenol and an alkali metal hydroxide, said alkali metal hydroxide being employed in the form of an aqueous solution containing at least 10 percent by weight of the alkali metal hydroxide.

3. A method for the manufacture of O-(2,4-dichlorophenyl) O,O-dimethyl phosphorothioate which comprises reacting in the absence of a catalyst and at a temperature of from 40° to 70° C. one molecular proportion of O,O-dimethyl phosphorochloridothioate with a mixture comprising at least one molecular proportion of each of 2,4-dichlorophenol and an alkali metal hydroxide, said alkali metal hydroxide being employed in the form of an aqueous solution containing at least 10 percent by weight of the alkali metal hydroxide.

4. A method for the manufacture of O-(2-chloro-4-tertiary-butylphenyl) O,O-dimethyl phosphorothioate which comprises reacting in the absence of a catalyst and at a temperature of from 40° to 70° C. one molecular proportion of O,O-dimethyl phosphorochloridothioate with a mixture comprising at least one molecular proportion of each of 2-chloro-4-tertiarybutyl phenol and an alkali metal hydroxide, said alkali metal hydroxide being employed in the form of an aqueous solution containing at least 10 percent by weight of the alkali metal hydroxide.

5. A method for the manufacture of O-(2,4,5-trichlorophenyl) O,O-diethyl phosphorothioate which comprises reacting in the absence of a catalyst and at a temperature of from 40° to 70° C. one molecular proportion of O,O-diethyl phosphorochloridothioate with a mixture comprising at least one molecular proportion of each of 2,4,5-trichlorophenol and an alkali metal hydroxide, said alkali metal hydroxide being employed in the form of an aqueous solution containing at least 10 percent by weight of the alkali metal hydroxide.

6. A method for the manufacture of O-(β-naphthyl) O,O-dimethyl phosphorothioate which comprises reacting in the absence of a catalyst and at a temperature of from 40° to 70° C. one molecular proportion of O,O-dimethyl phosphorochloridothioate with a mixture comprising at least one molecular proportion of each of β-naphthol and an alkali metal hydroxide, said alkali metal hydroxide being employed in the form of an aqueous solution containing at least 10 percent by weight of the alkali metal hydroxide.

References Cited in the file of this patent
UNITED STATES PATENTS

| | | |
|---|---|---|
| 2,692,891 | Young et al. | Oct. 26, 1954 |
| 2,761,806 | Boyer | Sept. 4, 1956 |

OTHER REFERENCES

Karrer: "Organic Chemistry," Elsevier Publishing Co. Inc., New York, (1950), p. 552.